United States Patent
Jastrzembski et al.

(10) Patent No.: US 8,568,145 B2
(45) Date of Patent: Oct. 29, 2013

(54) PREDICTIVE PERFORMANCE OPTIMIZER

(75) Inventors: Tiffany S Jastrzembski, Centerville, OH (US); Stuart M Rogers, Dayton, OH (US); Kevin A Gluck, Beavercreek, OH (US); Michael A Krusmark, Phoenix, AZ (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 62 days.

(21) Appl. No.: 13/213,127

(22) Filed: Aug. 19, 2011

(65) Prior Publication Data
US 2012/0077158 A1    Mar. 29, 2012

Related U.S. Application Data

(60) Provisional application No. 61/387,031, filed on Sep. 28, 2010.

(51) Int. Cl.
*G09B 19/00*    (2006.01)
(52) U.S. Cl.
USPC ............ 434/219; 434/176; 434/428; 434/430
(58) Field of Classification Search
USPC ........ 434/11, 176, 219, 428, 430; 706/15, 16, 706/19, 21, 45
See application file for complete search history.

(56) References Cited

U.S. PATENT DOCUMENTS

| | | | |
|---|---|---|---|
| 6,917,926 B2* | 7/2005 | Chen et al. ................... 706/12 |
| 7,213,006 B2* | 5/2007 | Hartman et al. .............. 706/16 |
| 2004/0241629 A1* | 12/2004 | Ondrusz et al. .............. 434/247 |
| 2007/0150424 A1* | 6/2007 | Igelnik ........................... 706/15 |
| 2009/0123895 A1* | 5/2009 | Hill et al. ..................... 434/219 |
| 2009/0177602 A1* | 7/2009 | Ning et al. .................... 706/21 |

OTHER PUBLICATIONS

Jastrzemski et al."Training performanc prediction", Jun. 2006, Air Force Research Laboratory, Mesa research site, paer No. 292 pp. 1-15.*
Jastrzembski et al, "Knowledge Tracing and Prediction of Future Trainee Performance", I/ITSEC Proceedings pp. 1498-1508, Orlando FL, 2006.

* cited by examiner

*Primary Examiner* — Robert J Utama
*Assistant Examiner* — Sadaruz Zaman
(74) *Attorney, Agent, or Firm* — AFMCLO/JAZ; Charles Figer

(57) ABSTRACT

A method, apparatus and program product are provided for optimizing a training regimen to achieve performance goals. Historical training data is provided. At least one training regimen is defined. A training objective is selected for at least one training regimen to optimize. The training regimen is optimized by computing an initial training regimen solution and computing a neighbor solution at a distance from the initial training regimen solution. The neighbor solution is compared to the initial training regimen solution. If the neighbor solution is determined to be a better solution than the initial training regimen solution, the initial training regimen solution is replaced with the neighbor solution. The distance is updated per a schedule to compute a next neighbor solution.

20 Claims, 9 Drawing Sheets

PREDICTIVE PERFORMANCE OPTIMIZER

CROSS-REFERENCE TO RELATED APPLICATIONS

This application claims the benefit of U.S. Provisional Application Ser. No. 61/387,031, entitled "Predictive Performance Optimizer," filed on Sep. 28, 2010, the entirety of which is incorporated by reference herein.

RIGHTS OF THE GOVERNMENT

The invention described herein may be manufactured and used by or for the Government of the United States for all governmental purposes without the payment of any royalty.

FIELD OF THE INVENTION

The present invention generally relates to predictive optimization of performance for a domain and, more particularly, to a cognitive tool aimed at tracking and predicting human performance for purposes of optimizing performance around a specified goal.

BACKGROUND OF THE INVENTION

Training people to stable levels of high performance in specialized skills requires a great deal of investment in both time and capital. This is particularly true in highly complex domains like military operations, where a warfighter may receive years of training before achieving mission ready status. Given the length, complexity, and cost of warfighter training, it is ironic and disappointing that warfighter readiness status is often defined by simple number of training hours completed or by subjective ratings of performance using checklists, rather than through objective means. Thus, it may be the case that two individual warfighters appear identical on paper in terms of training history, but operationally, quantitatively and qualitatively function at very different levels of effectiveness.

Intelligent tutoring systems are intended to optimize learning by adapting training experiences on the basis of proficiency. These systems continuously estimate the trainee's current knowledge and skill levels based on performance history and build what has been termed a representation of the student. They dynamically update estimates of the knowledge state in the student model as the learner accumulates more experience and expertise, and then adapt training to improve the efficiency and effectiveness of learning opportunities.

Among the demonstrably successful intelligent tutoring systems is the COGNITIVE TUTORS® system that originated at Carnegie Mellon as test beds for the ACT® theory of skill acquisition. Their implementation was inspired by ACT-problem solving, with skills decomposed into production rules. The tutors proved so effective that a successful spinoff company, Carnegie Learning, eventually formed to mature and distribute the technology to school districts around the country. The tutors are now being used by more than 800 schools.

The student modeling capability in the COGNITIVE TUTORS® is a Bayesian estimate of the probability of having mastered each of the knowledge units (production rules) that are targets of current instruction. Their Bayesian equation is used in a process called "knowledge tracing" to keep this mastery estimate current and provide a basis on which to determine the course of instruction. This approach has been quite successful in classroom applications.

Notwithstanding the documented utility of the knowledge tracing approach, it does have a critical limitation, as does every other contemporary student modeling approach. The limitation is that intelligent tutors have no underlying mechanism for memory decay represented in the model. Thus, even over significant periods of non-practice, when some forgetting would inevitably occur, the student model assumes that the learner's knowledge state remains stable across periods of non-use, leaving all prior learning completely intact. This limits the utility of traditional student modeling approaches entirely to estimates of current readiness/proficiency/mastery. They have no capacity to predict what future readiness will be at specific points in time.

Furthermore, traditional student modeling approaches are unable to make predictions regarding knowledge and skill changes under various future training schedules or to prescribe how much training will be required to achieve specific levels of readiness at a specific future time. They function only on the learner's last computed knowledge state, and provide training for only the current benchmark task needed to be learned.

One of the more consistent findings from past research in human memory is that performance is generally enhanced when learning repetitions are spaced farther temporally. This phenomenon, often termed the spacing effect, is extremely robust and has been observed not only in artificial laboratory settings, but in real-life training situations as well. Due to its ubiquity, it may be inferred that basic principles of learning and retrieval are involved.

This phenomenon is not captured by most existing models of human memory, which generally assume that memory traces additively strengthen with each learning opportunity and continually decay with passage of time. These models reveal contrary prediction to empirical human data as a result, showing improved performance under massed compared to distributed conditions.

As a common practice in the field of cognitive modeling, most modelers judge the explanatory power and descriptive adequacy of their models on the basis of goodness-of-fit measures comparing model predictions to human empirical data in each highly specialized task environment for which those models had been developed. It is far less typical to assess the generalizability or predictive power of a single model across multiples sets of data, tasks, or domains. It is also atypical for modelers to investigate substantive variations in the implementation of a single model, where multiple mechanisms could potentially achieve equivalent values in goodness-of-fit. Thus, the common practice of basing model performance on the goodness-of-fit criterion alone may lead a modeler to erroneously conclude that true underlying process regularities have been captured, which could in turn lead to faulty theoretical claims.

To minimize this probability and to effectively evolve cognitive theory, the modeling community must conduct more thorough investigations of model instantiations, whereby selection should be based on formal comparison criteria. The most widely used means of model comparison is quantitative in nature, and is referred to as goodness-of-fit or descriptive adequacy. Assessment in this criterion includes optimizing model parameters to first find the best fit, and then choosing the model that accounts for the most variance in the data (typically calculated as root mean square deviation {RMSD} or sample correlation {$R^2$}). This practice is a critical component of model selection, but simply selecting a model that achieves the best fit to a particular set of data is critically insufficient for determining which model truly captures underlying processes in the human system. In fact, basing model selection on this criterion alone will always result in the most complex model being chosen, meaning that over fitting the data and generalizing poorly could be very real problems, and interpreting how implementation ties to underlying processes may be all but impossible.

The inclusion of additional qualitative model selection criteria (i.e. weighing the necessity of added parameters) helps overcome these pitfalls and improves the chances of selecting models that offer more insight into how human memory functions. Because complex models are more likely to have the ability to capture a particular set of data well, including the possibility of capturing noise, it is necessary to embody the principle of Occam's Razor in model selection tools by balancing parsimony with goodness-of-fit. This translates into accounting for both the number of parameters included in a model, and the model's functional form, defined as the interplay between the model factors and their effect on model fit.

Contemporary methods of attaining capabilities such as effectively tracking a trainee's unique learning dynamics, user-specified future training regimens and performance predictions related to those regimens, visual and graphical examinations and comparisons, extrapolation to generate precise, quantitative predictions of performance for each specified future training time, etc., is to handcraft each mathematical model for every data set (e.g., each learner needed to be modeled separately for each variable of interest) to be examined using contemporary tools such as a spreadsheet. As such, all training history and training specification needed to be hand-entered, meaning that the precise timing (in seconds) associated with training event length, time between training events, and overall time in training needed to be calculated to equip the mathematical model with the necessary information to track, predict, and prescribe human performance. This is an error-prone, time consuming process, requiring a high degree of knowledge and skill to do correctly.

The spreadsheet's solver may be utilized to identify optimal model parameters to best fit data from a learner's history (using maximum likelihood estimation). These values are then integrated into the model to generate and extrapolate predictions beyond the learner's history for specified future dates in time. Use of the spreadsheet's graphing capability may then be employed to visualize the trainee's historical performance and model predictions. Statistics (including correlations and root mean squared deviations) may also be calculated within the spreadsheet to examine the model's goodness-of-fit to the human data, as well as its predictive validity and cognitive plausibility.

If the modeler wished to examine multiple future training regimens, each of those regimens would have had to be entered by hand into separate spreadsheets, requiring the modeler to correctly enter the number of seconds associated with the training length, time between training events, and the total amount of time in training as described above; and the modeler would also have to ensure that the model implementation for the new predictions integrated the correct, optimized parameters, calculated using the solver function. Then additional graphs would have needed to be produced either separately, or integrated across spreadsheets, so that performance effectiveness across regimens could be adequately compared. This proves to be a very laborious, slow, inefficient way to examine the learning and retention tradespace, it is very easy to make an error in handcrafting these spreadsheets correctly, and it requires modeling expertise to ensure that the model implementation and optimized parameters are correctly set for each predicted point.

Further, if more optimal training schedules wished to be generated in the spreadsheet, the process in finding the ideal timing for each event could only be achieved through trial-and-error, incrementing or decrementing the amount of time that passes, and checking the model prediction to seek how it compares to the desired threshold performance level. Thus, the modeler would have needed to input specific future times (in seconds) one at a time, to find the tipping point where performance effectiveness no longer met the desired goal. Once that point was found, the same procedure would need to be repeated to identify when the next training event should occur, and on and on.

What is needed in the art, therefore, is an automated, cognitively-principled tool that can underpin decisions for "just in time" training and would assist in optimizing performance obtained and resources expended. Additionally, a tool that assists managers in overall resource allocation and in optimizing training programs such that individuals are provided adequate training opportunities to achieve needed performance without waste would be of substantial benefit.

SUMMARY OF THE INVENTION

Embodiments of the invention address the need in the art by providing a method, apparatus and program product for optimizing a training regimen tailored to the learning needs of the individual trainee/learner, team, or squadron to achieve performance goals. In some embodiments implemented as a software tool, the tool enables an operator to provide historical training data to the tool, defining at least one training regimen, and select a training objective for the training regimen to optimize. Embodiments of the software tool optimize the training regimen by computing an initial training regimen solution, as calculated through the underlying predictive model, and computing a neighbor solution at a distance from the initial training regimen solution. The neighbor solution is compared to the initial training regimen solution and if the neighbor solution is a better solution than the initial training regimen solution, the initial training regimen solution is replaced with the neighbor solution. The distance may then be updated per a schedule to compute a next neighbor solution.

In some embodiments, the neighbor solution is a better solution if a difference between a model prediction of the solution and training objective decreases. In some embodiments, optimizing the training regimen further includes computing neighbor solutions until a local minima or local maxima is found. In some of these embodiments, the optimizer may utilize Monte Carlo methods to compute the neighbor solutions. The training objective may include performance objectives, cost objectives, and/or schedule objectives.

In some embodiments of the software tool, predicted training performance may be graphically overlaid with optimized training performance. In some embodiments of the software tool, historical training performance may be graphically displayed with at least one of predicted training performance or optimized training performance regimens. Some embodiments may additionally allow the provided historical training data to be updated as new training data becomes available.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
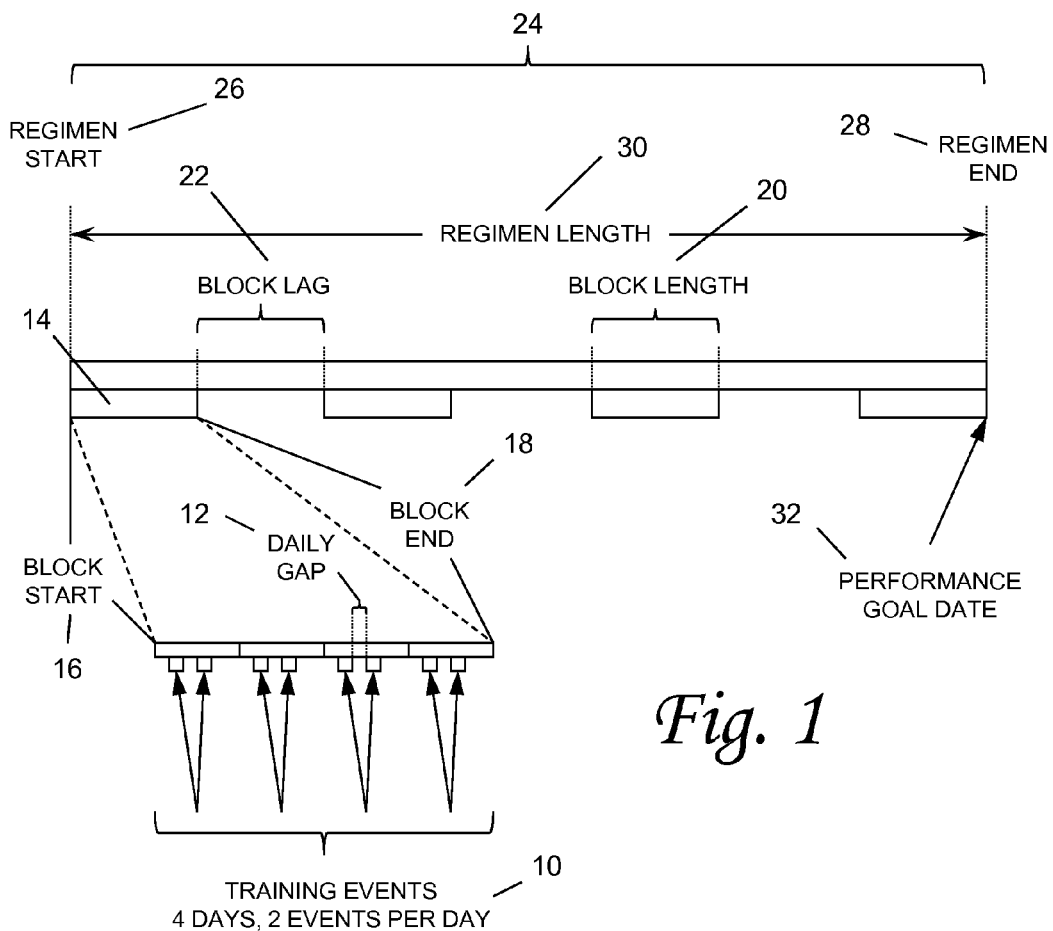
FIG. 1 is a diagrammatic illustration of an exemplary training regimen.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the need in the art by providing several important advantages over the contemporary spreadsheet modeling method, and bringing new innovations to existing software tools currently on the market. In some embodiments, the likelihood of human error associated with hand-crafted modeling may be reduced. In these embodiments the modeling development and validation process times may be greatly reduced, as results are computed immediately, dynamically, and in an automated fashion. In some embodiments predictions for out-of-sample notional data may be rapidly entered into a graphical user interface, so that from a model development standpoint, cognitive plausibility and adherences to cognitive theory may be thoroughly and quickly examined and explored. Some embodiments provide immediate and dynamic graphical visualizations of the model predictions and allow multiple regimen performance pathways to be presented at the same time. This may assist in greatly enhancing and speeding an operator's ability to extract necessary information from the model, and may assist in providing a modeler with an ability to assess the efficacy of any modifications made to the underlying model. Other embodiments may enable optimized training pathways, if desired. These embodiments are able to search a tradespace much more exhaustively than by hand in spreadsheets, and may do so orders of magnitude faster.

Embodiments of the invention automate the modeling process for performance prediction while accounting for effects of spacing (temporal distribution on training effects the stability of knowledge and skill). This allows the embodiments to validly track human performance as a function of how events are spaced in time, to predict performance for specific future times based upon how stable knowledge and skill sets are identified to be from training history, and to utilize identified mathematical regularities of the learner to prescribe more optimal future training schedules aimed at achieving training goals (e.g., maintain performance above a specified threshold over the course of specified length of time, attain a desired effectiveness level by a certain date, and/or optimize training resources to enhance retention.)

Embodiments of the invention are based upon a solid foundation of cognitive science, and therefore, provide operators, modelers, or managers with principled guidance concerning training decisions and unique learning needs of the individual trainee/learner, team, or squadron, in order to assist in making training more efficient and effective. Embodiments of the invention allow non-modelers to make informed decisions on training and learning needs, through a user-friendly, intuitive interface that does not require cognitive modeling expertise. The underlying model in these embodiments functions by capitalizing on learning signatures and mathematical regularities in the human memory system to best schedule the timing and frequency of future training events that will assist in maximizing performance around specific training goals, constrained as necessary by the logistical practicalities of the real world.

One of many potential uses for the embodiments of the invention would be to identify an optimum training regimen to achieve one or more specified training program goals. These goals generally focus on a combination of desired performance levels, resource utilization, and temporal factors. For example, such goals for development purposes may include:

(a) achieve a specified performance level by a given date;
(b) minimize the training resources needed to achieve a specified performance level; and
(c) achieve a specified performance level by a given date, then maintain the performance level using minimum training resources, though any number of other goals may also be a factor in the training regimen.

An optimization functionality is implemented in the embodiments of the invention as a simulated annealing algorithm that searches the space of a possible training regimen. Objective functions used in the algorithm may be unique to each optimization goal. As an example, the objective function for the goal (a) above was the minimization or maximization of the value of the predicted final performance level on the target date.

In order to validate performance predictions from existing literature and to provide the greatest flexibility to training resource managers, embodiments of the invention support non-uniform or non-regular training regimen definitions. This assists in allowing the definition of complex and realistic training regimen. In operational contexts, training regimens consist of multiple training events on days across a period of weeks, months, or years.

"Non-regular" refers to several components of the training regimen definition including the number and timing of training events on a given day, the length of the training events, the number of days within a training block on which training occurs, the number of training blocks within a training regimen, the amount of time between training blocks, and the overall length of the training regimen. In defining a regimen, the embodiments employ a straightforward vocabulary that should be readily understood across a large number of training domains. Components and the vocabulary for a training regimen used with embodiments of the invention are illustrated in FIG. 1.

A "training event" 10 is a discrete training event that may last from about fifteen minutes to a few hours, though other durations of the training event 10 are also possible. Multiple training events 10 may be performed on a single day separated by a "daily gap" 12. A training "block" 14 is a contiguous set of days during which the same number of training events 10 are performed on each day in the "block" 14. Each block 14 is defined with a start 16 and an end 18 and has a block length 20, which may be as short as a single day or may span several days, though other block lengths 20 either shorter or longer are also possible. Following a training block 14 is a block "lag" 22 period that may be as short as a single day or may span several months, though the block lags 22 may also be shorter or longer in duration. Taken together, the training events 10, blocks 14, and lags 22 make up a training regimen 24. Similar to the training blocks 14, the regimen 24 has a start 26 and end 28 defining a regimen length 30. The regimen start 26 and end 28 dates may be coordinated with a performance goal date 32 associated with the overall training.

Figure 2:
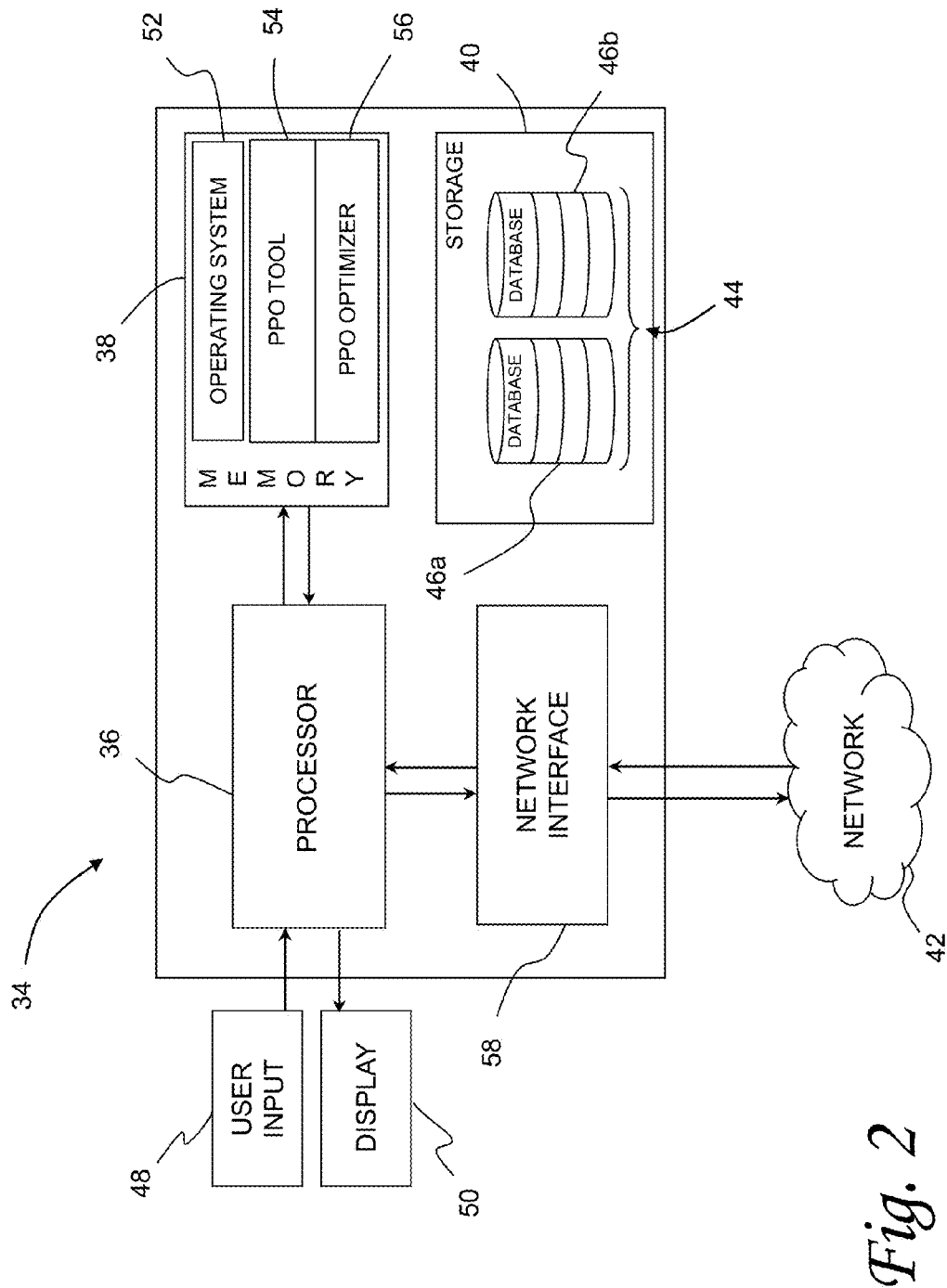
FIG. 2 is a diagrammatic illustration of a hardware and software environment for an apparatus configured to optimize training events consistent with embodiments of the invention.

Using these definitions, training regimens 24 may be created, adapted or modified to better accomplish performance goals such as shorter training sessions with better participant retention. The manipulation of the training regimens may be accomplished by incorporating the embodiments of the invention into a software tool referred to as a Predictive Performance Optimizer (PPO), which may be implemented on any number of computer platforms. For example, FIG. 2 illustrates an exemplary hardware and software environment for an apparatus 34 suitable for automating the modeling process for performance prediction and identifying optimum training regimens in a manner consistent with the invention. For the purposes of the invention, apparatus 34 may represent practically any computer, computer system, or programmable device, e.g., multi-user or single-user computers, desktop computers, portable computers and devices, handheld devices, network devices, mobile or smart phones, etc. Apparatus 34 will hereinafter be referred to as a "computer" although it should be appreciated that the term "apparatus" may also include other suitable programmable electronic devices.

Computer 34 typically includes at least one processor 36 coupled to a memory 38. Processor 36 may represent one or more processors (e.g. microprocessors), and memory 38 may represent the random access memory (RAM) devices comprising the main storage of computer 34, as well as any supplemental levels of memory, e.g., cache memories, non-volatile or backup memories (e.g. programmable or flash memories), read-only memories, etc. In addition, memory 38 may be considered to include memory storage physically located elsewhere in computer 34, e.g., any cache memory in a processor 36, as well as any storage capacity used as a virtual memory, e.g., as stored on a mass storage device 40 or another computer (not shown) coupled to computer 34 via a network 42. The mass storage device 40 may contain a cache or other dataspace 44 which may include databases 46a and 46b, either of which may contain stored historical performance data.

Computer 34 also typically receives a number of inputs and outputs for communicating information externally. For interface with a user or operator, computer 34 typically includes one or more user input devices 48 (e.g., a keyboard, a mouse, a trackball, a joystick, a touchpad, a keypad, a stylus, and/or a microphone, among others). Computer 34 may also include a display 50 (e.g., one or more CRT monitors, one or more LCD display panels, and/or a speaker, among others). The interface to computer 34 may also be through an external terminal connected directly or remotely to computer 34, or through another computer communicating with computer 34 via a network 42, modem, or other type of communications device.

Computer 34 operates under the control of an operating system 52, and executes or otherwise relies upon various computer software applications, components, programs, objects, modules, data structures, etc. (e.g. PPO Tool 54, optimizer 56). The optimizer 56, for example, may optimize training regimens 24 stored on databases, such as the database 46a, 46b in the dataspace 44 in the overall PPO Tool 54. Computer 34 communicates on the network 42 through a network interface 58.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 2 is not intended to limit the present invention. Indeed, those skilled in the art will recognize that other alternative hardware and/or software environments may be used without departing from the scope of the invention.

Figure 3:
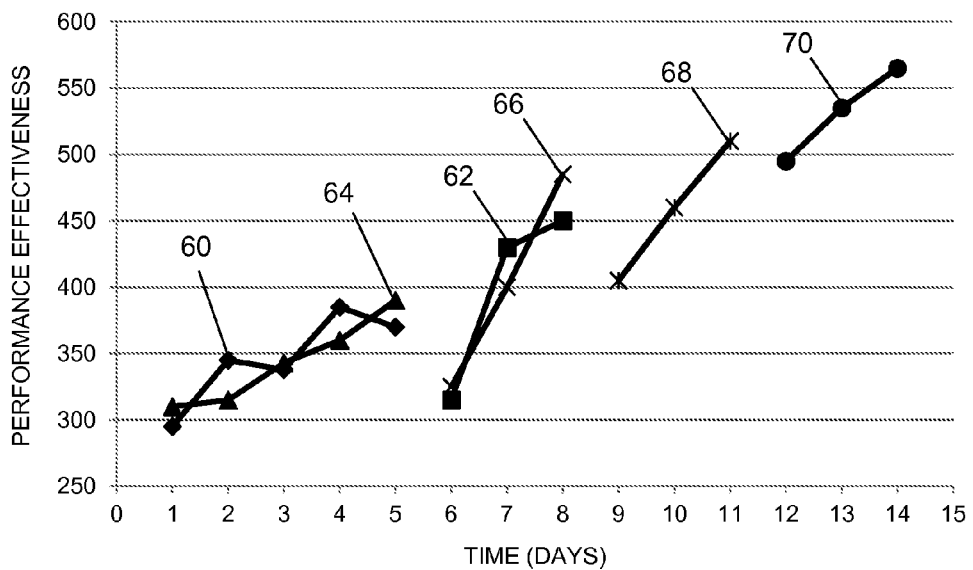
FIG. 3 is a graph of historical and predicted performance after training.

For example, in a particular embodiment of the invention, the PPO may be implemented in JAVA® to take advantage of the many open source tools and libraries, as well as a large user community. The PPO, regardless of its underlying implementation, is a software tool that enables an operator to track performance data over the course of a learner's training history for any quantitative measure of performance that generates a learning curve. It generates performance predictions at specified future points in time, and allows operators to visually and graphically assess and compare the impact of potential future training regimens. These can be seen by the exemplary curves in the graph in FIG. 3. Curves 60 and 62 illustrate actual, historical performance data. Curves 64 and 66 are predicted performance correlating to the curves 60 and 62. Curves 68 and 70 illustrate predicted future performance. The PPO accomplishes this by utilizing a mathematical model for performance prediction (shown in equation (2) below) and inspired by the General Performance Equation by Anderson & Schunn published in 2000.

The Predictive Performance Equation (PPE) shown in equation (1) below is comprised of three main parts: the power law of learning ($N^c$), the power law of forgetting ($T^{-d}$), and a stability term (St) which captures the effects of practice and retention as they are spaced over time.

$$\text{Performance} = S \cdot St \cdot N^c \cdot T^{-d} \quad (1)$$

where free parameters include S, a scalar to accommodate any variable of interest, c, the learning rate, and d, the decay rate. Fixed parameters include T, defined as the true time passed since training began, and N, defined as the discreet number of training events that have occurred over the training period.

The term St is defined in equation (2) below:

$$St = \left[ \frac{\Sigma \text{lag}}{P} \cdot \frac{P_i}{T_i} \cdot \frac{\Sigma_i^j (lag_{max_{i,j}} - lag_{min_{i,j}})}{N_i} \right] \quad (2)$$

where lag is defined as the amount of true time passed between training events and P is defined as the true amount of time amassed in practice. In the equation's current form, experience and training distribution attenuate performance by affecting knowledge and skill stability at the macro-level of analysis. In alternate embodiments of the PPO, other models may be used. Additionally, alternate embodiments of the PPO may utilize updated models as the models evolve as a result of additional research.

Figure 4:
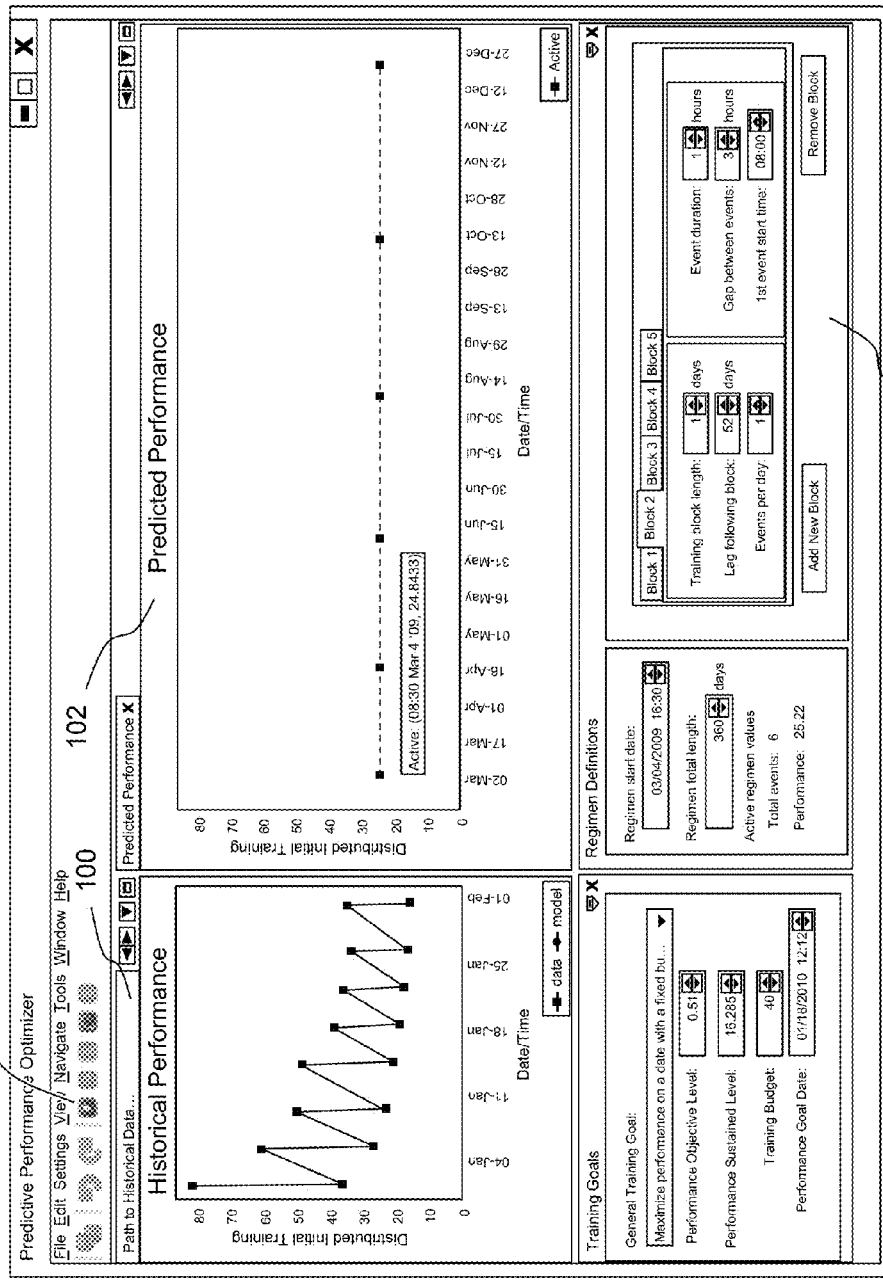
FIG. 4 is a representation of a graphical user interface for use with the apparatus in FIG. 2.

Embodiments of the PPO were built as a desktop software application having a graphical interface 72, a representation of which is illustrated in FIG. 4. A typical operator interacts with PPO using a mouse or other pointing device and a keyboard (user input 48) based on established usability paradigms that are found on may current software systems.

Embodiments of the PPO may contain one or more of the following primary functions, though other functions, not listed, may also be incorporated:
(a) open, close, create, edit, and save data files;
(b) display historical performance data and predicted performance data;
(c) dynamically edit the training regimen definition including regimen start data;
(d) export prediction data;
(e) display multiple predicted performance regimen; and
(f) run regimen optimization goal to find improved regimen definitions.

Figure 5:
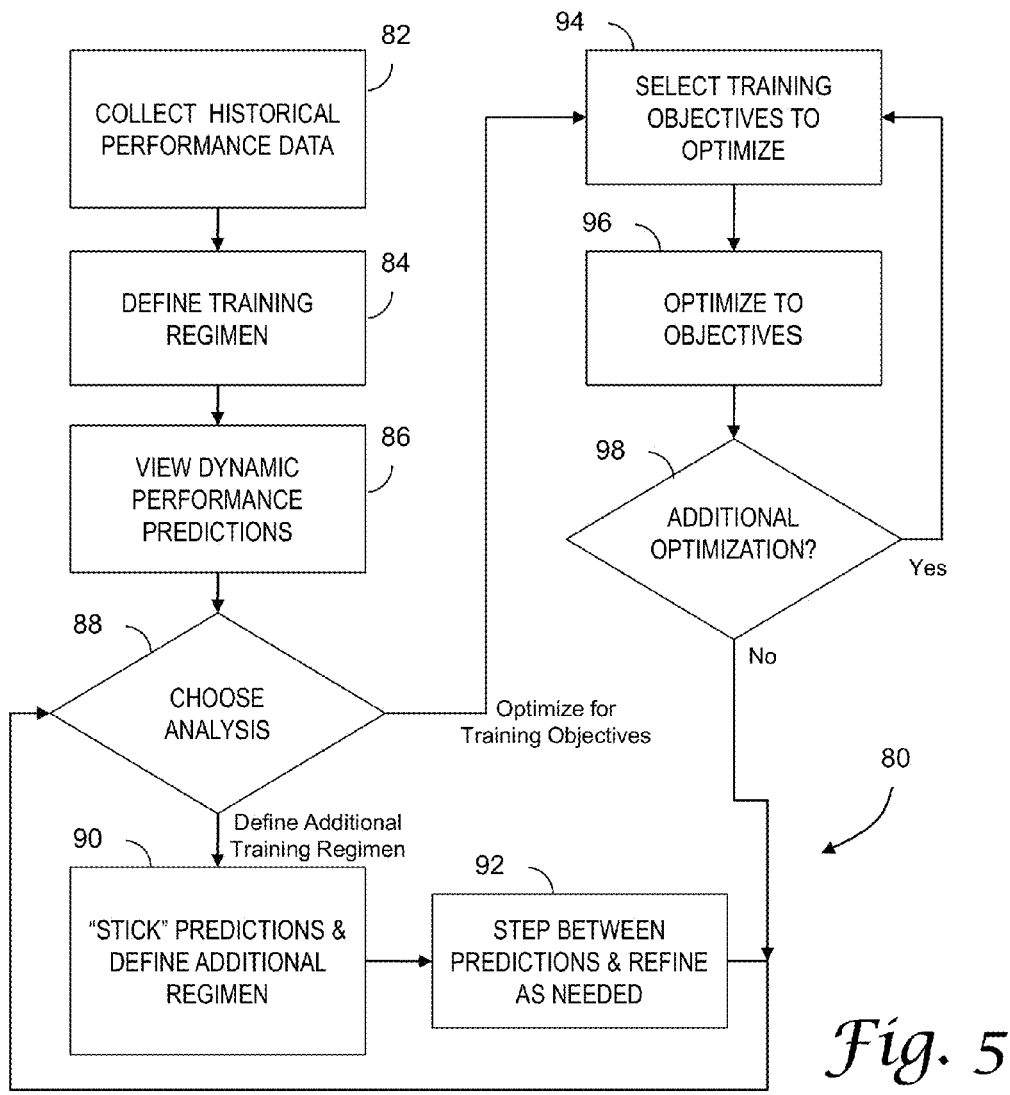
FIG. 5 is a flow diagram of the overall work flow for predictive performance and optimization of training events.

Flowchart 80 in FIG. 5 illustrates the overall work flow using PPO. The process beings by collecting historical performance data in block 82. In some embodiments, the data file may contain the historical performance data for an individual or in other embodiments, for a team. This data, in some embodiments, may be created using a spreadsheet before storing it for the PPO. These historical training data generally consists of dates and times of individual training events, performance scores for a task (such as percent error in a mission qualification task), and additional calibration data that may have been generated by statistical analyses, though additional or different information may also be part of the historical training data. If calibration data have not been previously created, the calibration data may be generated within PPO after opening a data file, in some embodiments.

A training regimen is defined at block 84 and dynamic performance predictions are viewed at block 86. At this point, an operator of PPO may choose an analysis of the data at block 88. If the operated determines to define additional training regimen, then the operator may create static copies of the predictions for later comparison and then define the additional training regimen at block 90. At block 92, the operator of PPO may then step between predictions and refine the predictions and other data as needed before choosing another analysis at block 88.

Alternatively the operator of PPO may decide to optimize for training objectives when choosing the analysis at block 88. For this analysis, the operator selects training objectives to optimize at block 94. The objectives are then optimized at block 96. If there are additional optimizations to be performed ("Yes" branch of decision block 98), then additional objectives are selected and block 94 and additional optimizations are performed at block 96. Otherwise ("No" branch of decision block 98), the operator may choose another analysis at block 88.

Figure 6:
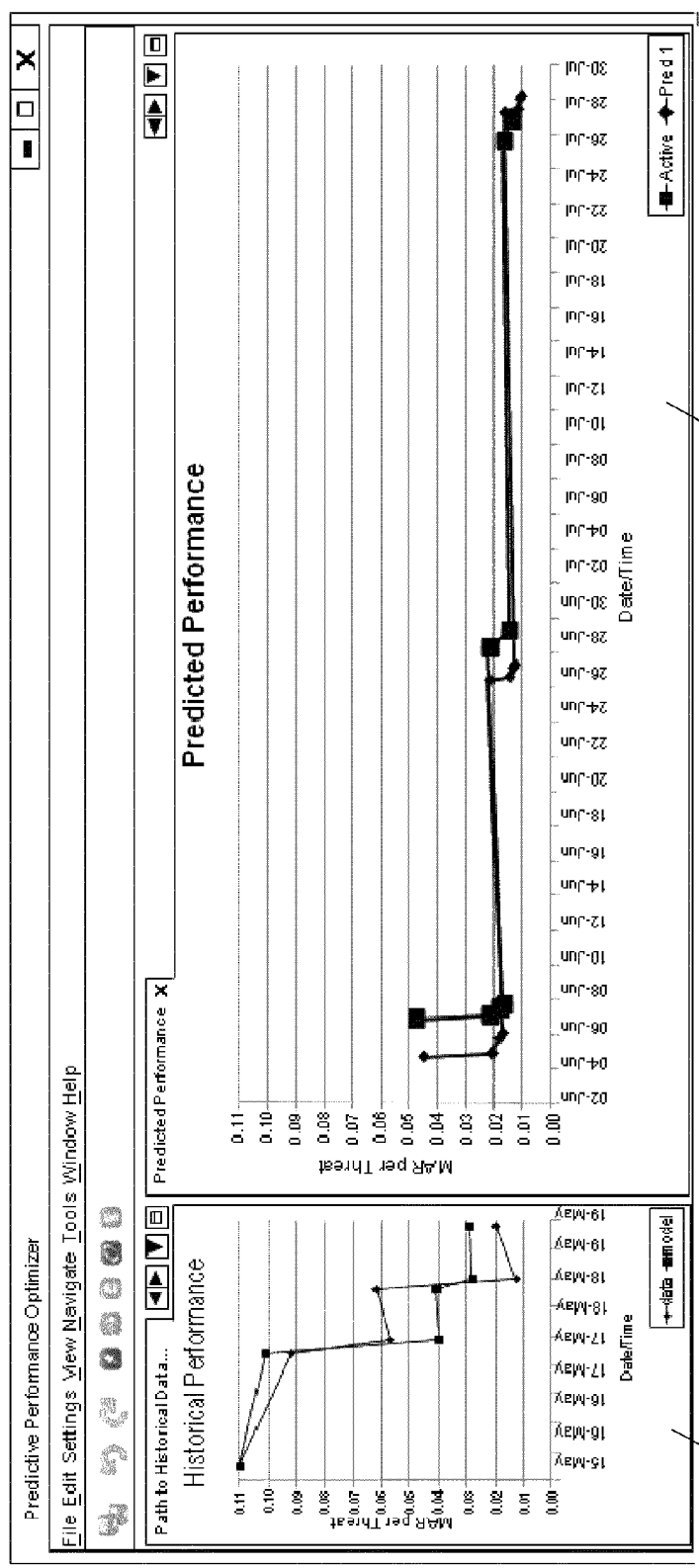
FIG. 6 is a detailed representation of a portion of the graphical user interface in FIG. 4.

With an opened data file, PPO will display two charts 100, 102 as seen in FIGS. 4 and 6. One will be the human performance data shown along with the model's calibration fit to the performance. This chart 100 is labeled "Historical Performance." The other chart 102 is labeled "Predicted Performance" and as expected is the chart of PPO's predicted performance levels on the dates and time that are defined in the regimen definition settings in PPO. Examples of these charts 100, 102 may be best seen in FIG. 6, which is the reproduction of the portion of the graphical user interface 72 of FIG. 4.

Figure 7:
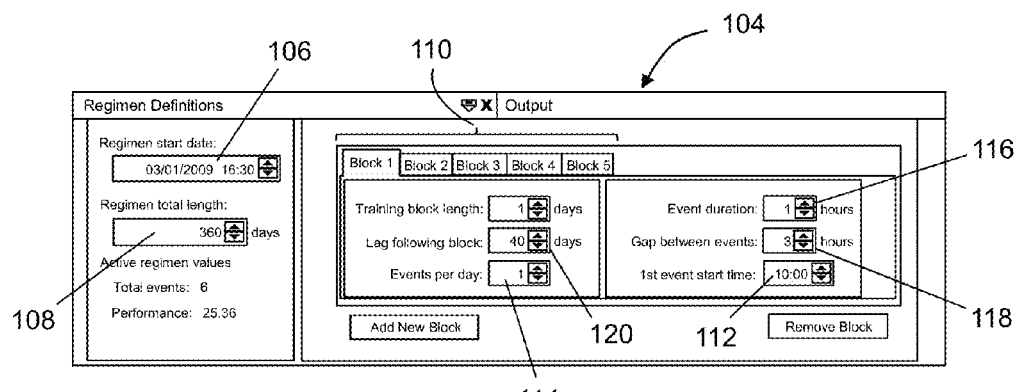
FIG. 7 is a detailed representation of another portion of the graphical user interface in FIG. 4.

In some embodiments, a training regimen for predictions is defined within PPO using the "Regimen Definition" panel 104, which may be best seen in FIG. 7. This panel 104 contains a number of controls through which an operator may set a regimen start date 106, a total regimen length 108 in days, block definitions 110 including training event start times 112, number of training events per day 114, training event duration 116, gap between training events during the day 118, and lag in days following each block 120. The only restriction on the regimen start date 106 is that the predicted training regimen cannot start before the end date of the historical training period.

The specific training event related setting may be different for each block 110. Thus, during one block that may be three days long, there may be two one-hour training events per day with four hours in between each training event. The next block may follow a lag of eleven days and may consist of one training event per day for ten days. Blocks of training events may vary widely from block to block, and thus training regimens may be defined in nearly unlimited variety.

As operators of PPO enter or edit the training regimen definition, PPO automatically updates and displays the predicted performance level for each event based on its internal model. This dynamic and interactive method for defining and displaying a training regimen and its associated performance levels greatly enables exploration of possible training approaches.

To assist in improving the ability to compare differing training regimens, PPO, in some embodiments, may provide the ability to store and display a regimen definition in order to directly compare two or more regimens. Once an interesting regimen is defined, the operator may "stick" that regimen to the Predicted Performance Chart 102 using a pushpin button 103 on the task bar, though other methods of identifying and "sticking" the regimen may also be used. This action may then create a static copy of the active prediction, which will remain on the Predictive Performance Chart 102. Then, the active prediction line may be changed with the regimen definition controls 104 and will be reflected dynamically on the Predictive Performance Chart 102 while the stored prediction line remains fixed on the chart 102. This assists in simplifying a direct visual comparison of two or more training regimens. Also, with multiple prediction lines displayed an operator may step to any of the store lines making that stored line active for additional changes to its regimen definition. Using an iterative approach many different training regimens may be created, compared and refined to provide a comprehensive view of the implication of a spectrum of training approaches.

In some embodiments, the optimization of the training regimen may be implemented as a simulated annealing (SA) algorithm. In these embodiments, the SA algorithm may include a probabilistic Monte Carlo approach to locate the global or local optimum, i.e. the best available solution within the SA algorithm constraints, of the predictive model within a large search space in a fixed amount of time. This optimization implementation may then be applied to the definitions of objective functions that enable optimization of human performance achievement along multiple, specified dimensions set forth in more detail below.

Figure 8:
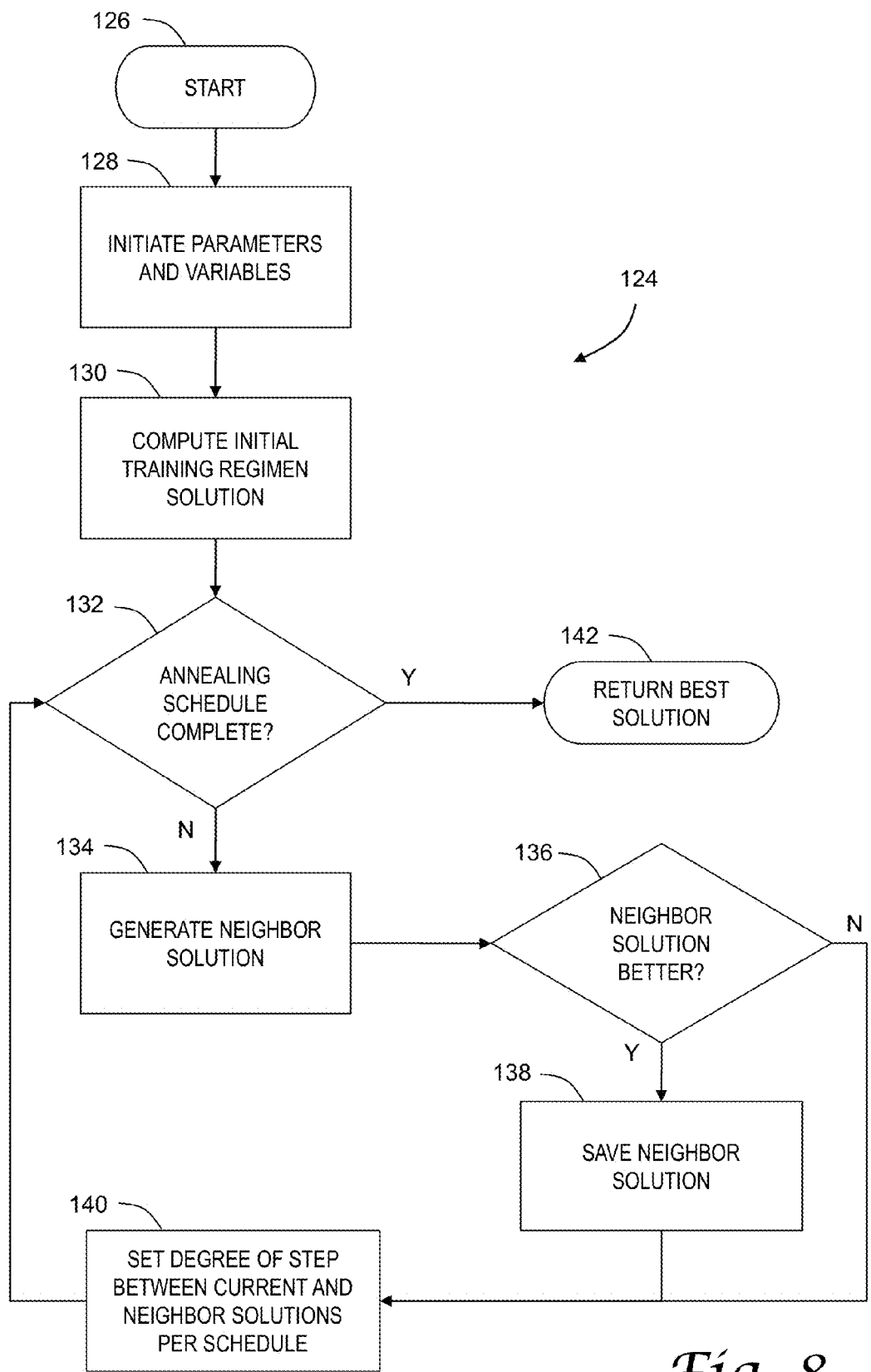
FIG. 8 is a detailed representation of a portion of the graphical user interface in FIG. 4 used to define training goals for optimization.

To begin the search for the optimized solution(s) and as seen in flowchart 124 in FIG. 8, the SA algorithm initializes the predictive model parameters and variables (block 128) to compute the current solution with a training regimen seed (block 130). While the search is not complete ("No" branch of decision block 132), the SA algorithm generates a next neighbor prediction (block 134), that may be some distance, d, from the prior training regimen seed, chosen according to a probability dependent upon a difference between a predictive model value and a global parameter the model is working to optimize towards, i.e. performance, cost, or schedule as defined by a user. If the neighbor solution is a better solution ("Yes" branch of decision block 136), then the SA algorithm replaces the current solution with the neighbor solution (block 138). A solution may be determined to be better if and only if that solution gradually decreases the aforementioned difference. The degree of step, or distance d, may then be set based on a schedule (block 140) and this process repeats at decision block 132 until a local optima is found. A solution may then be returned at block 142.

Figure 9:
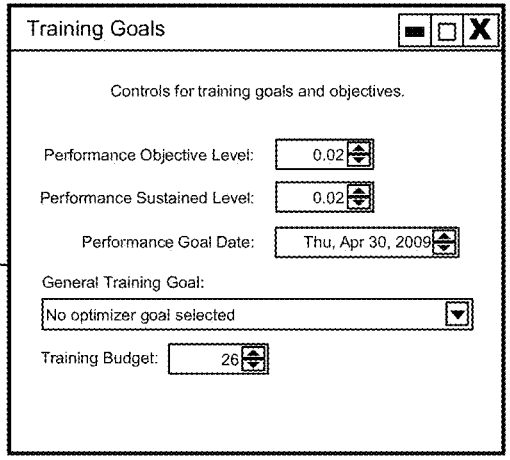
FIG. 9 illustrates further detail to the portion of the graphical user interface in FIG. 8.
Figure 10:
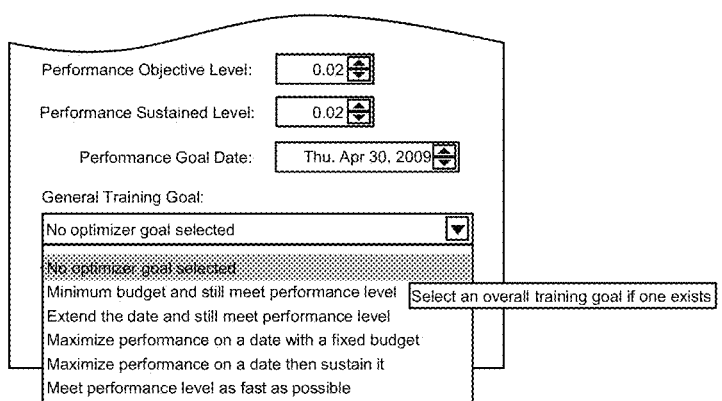
FIG. 10 is a flow diagram of an optimization algorithm used to optimize training events consistent with embodiments of the invention.

The objective function that the SA algorithm works to optimize are user-defined according to the specified human performance effectiveness goals below, and illustrated in FIGS. 9 and 10. In some embodiments, the goals may be selected from a Training Goals panel 143 of the user interface using a drop down box 144 for a general training goal. These goals may be performance, cost or schedule driven as illustrated by the exemplary goals as follows:

Performance 1: Maximize performance level for a given training regimen cost by a target date.

Performance 2: Maximize performance level in minimum time without constraint on training costs or resources.

Performance 3: Maximize performance level for a given cost and target date, then sustain performance level at the threshold performance setting for n days, where n is specified by the user.

Cost: Minimize training regimen costs to achieve a desired performance level by a target date.

Schedule: Maximally extend the date at which a desired performance level is achieved within a desired training cost without breaching a desired performance threshold.

Figure 11:
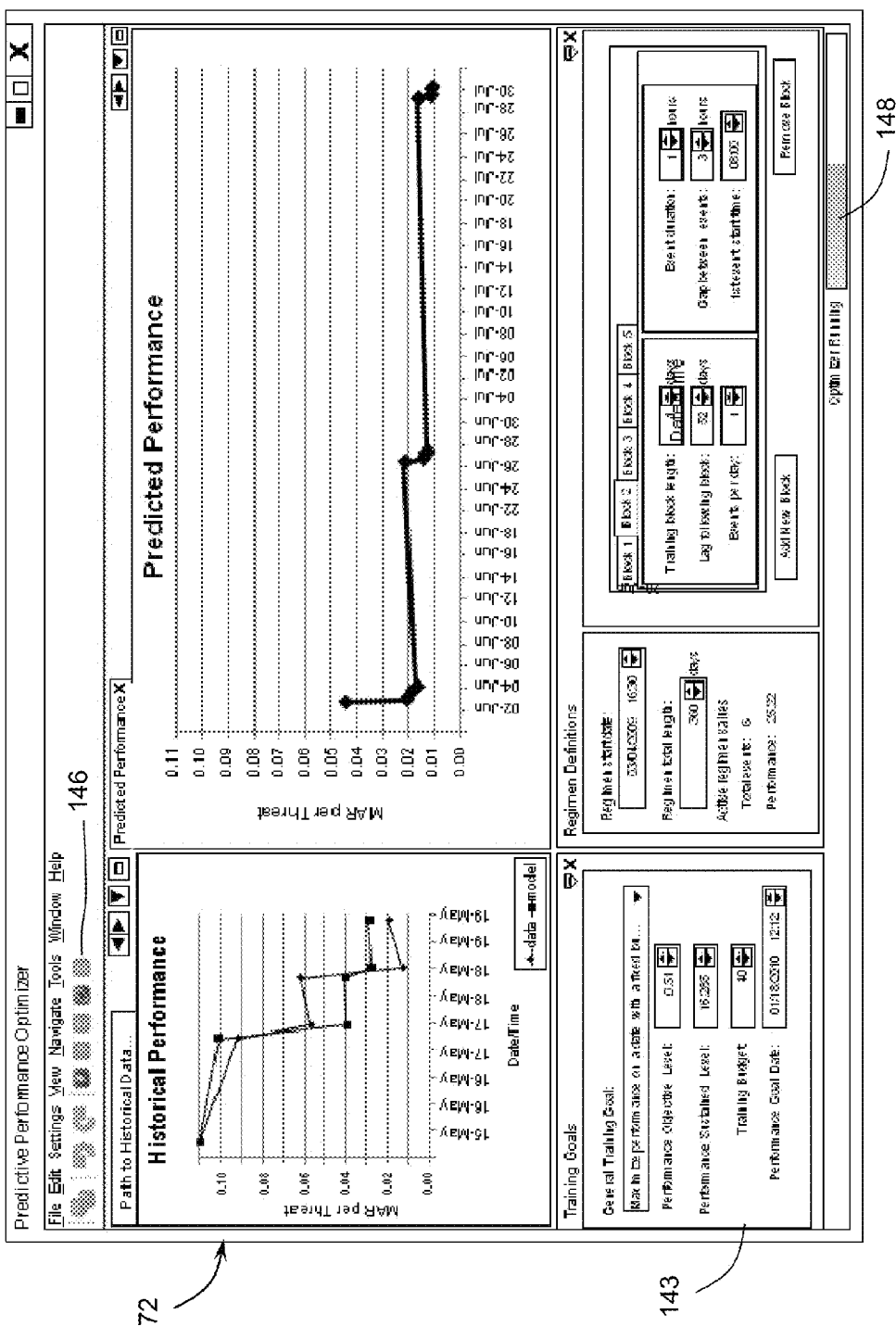
FIG. 11 is an alternate representation of the graphical user interface in FIG. 4 illustrating an optimization in progress.
Figure 12:
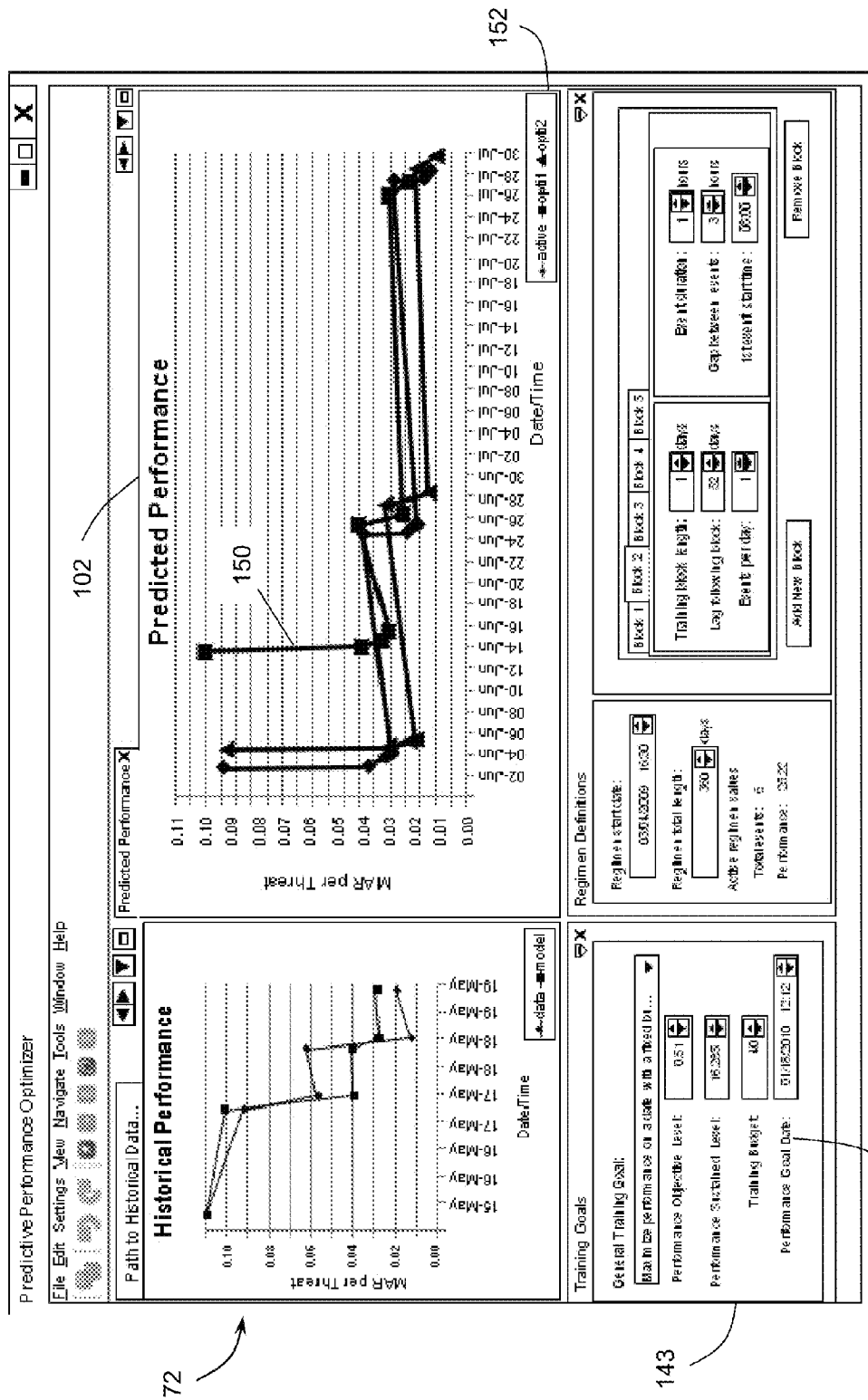
FIG. 12 is an alternate representation of the graphical user interface in FIG. 4 illustrating optimized exemplary regimens and training goals.

With each selected goal, the PPO optimization interface allows the user to specify training objectives and constraints (e.g., number of training hours allowed, dollar budget, performance goal date, or performance sustainment dates) using the Training Goals panel 143 and controls. When the user is satisfied with the data entered, the user simply presses the "Run Optimizer" button 146 as seen in FIG. 11. When goal optimization is initiated, the SA optimization algorithm executes the search of the candidate solution space to find a high quality solution in a reasonable amount of time. Progress of the optimization may be monitored by the bar 148 displayed on the user interface 72 in some embodiments. Candidate solutions are scored per the constraints and values associated with the overall goal settings. The generation of candidate solutions at each step in the search may be determined by the randomness allowed by the annealing schedule and a set of discrete training regimen neighborhood features. These features reflect the training regimen language (or vocabulary) defined within the PPO system. Finally, the optimized solution(s) appear(s) in the Prediction Chart 102 as a regimen line(s) 150, allowing the user to zoom in and examine each optimized predicted training point in fine-grained detail as illustrated in FIG. 12 and differentiated by optimizer labels in legend 152.

At times, an operator may need to edit some of the training history, the times or dates of events, the measured performance levels, or other calibration settings. The interface, in some embodiments, provides an ability to edit the historical training data through a History Data Table window (not shown). In this window, the training event date, time, performance value, and other calibration parameters may be edited similar to the regimen definitions discussed above. The operator may then save changes and a new calibration fit may be calculated and then displayed in the Historical Performance Chart 100, with the prediction line now reflecting the newly calibrated model.

Embodiments of the PPO system may assist in providing a manager, a scheduler, or an individual insight into important effectiveness and resource concerns, which may then be used to address such questions as:

(a) When will a given level of effectiveness be achieved under a given training structure?

(b) How much training is needed to achieve or maintain a given level of effectiveness?

(c) When should the training be delivered?

(d) What practice schedule best meets training goals given resource and time constraints?

(e) Will a specific budget be adequate for the necessary amount of unit training?

Embodiments of the invention apply state of the art cognitive science to the training resource management arena. These embodiments may assist leaders and managers in basing decisions concerning an individual's timing of training and the amount of training time required on scientific principles and actual performance measures rather than on traditional, standardized approaches that do not optimize the application of training resources.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of optimizing a training regimen to achieve performance goals, the method comprising:
    providing historical training data;
    defining at least one training regimen;
    selecting a training objective for the at least one training regimen to optimize; and
    optimizing the training regimen by:
        computing with a hardware based processor an initial training regimen solution;
        computing with the hardware based processor a neighbor solution at a distance from the initial training regimen solution;
        comparing with the hardware based processor the neighbor solution to the initial training regimen solution;
        determining if the neighbor solution is a better solution than the initial training regimen solution;
        replacing the initial training regimen solution with the neighbor solution if the neighbor solution is a better solution; and
        updating the distance per a schedule to compute a next neighbor solution,
    wherein the determining of the neighbor solution is a better solution occurs using Performance=$S \cdot St \cdot N^c \cdot T^{-d}$, and $$St = \left[ \frac{\sum lag}{P} \cdot \frac{P_i}{T_i} \cdot \frac{\sum_i^j (lag_{max_{i,j}} - lag_{min_{i,j}})}{N_i} \right],$$

wherein S is a scalar, c is a learning rate, d is a decay rate, T is true time passed since training began, N is a discreet number of training events over a training period, lag is an amount of true time passed between training events, and P is a true amount of time amassed in practice.

2. The method of claim 1, wherein the neighbor solution is a better solution if a difference between a predictive model variable of the solution and training objective decreases.

3. The method of claim 1, wherein optimizing the training regimen further comprises:
    computing neighbor solutions until a local minima or local maxima is found.

4. The method of claim 3, wherein optimizing the training regimen further comprises:
    utilizing Monte Carlo methods to compute the neighbor solutions.

5. The method of claim 1, wherein the training objective is selected from a group consisting of: performance objectives, cost objectives, schedule objectives, and combinations thereof.

6. The method of claim 1, further comprising:
    graphically overlaying predicted training performance with optimized training performance.

7. The method of claim 1, further comprising:
    graphically displaying historical training performance with at least one of predicted training performance and optimized training performance.

8. The method of claim 1, further comprising:
    updating the provided historical training data.

9. An apparatus comprising:
    a processor; and
    program code configured to be executed by the processor to optimize a training regimen to achieve performance goals, the program code further configured to provide historical training data, define at least one training regimen, select a training objective for the at least one training regimen to optimize, and optimize the training regimen by:
        computing an initial training regimen solution;
        computing a neighbor solution at a distance from the initial training regimen solution;
        comparing the neighbor solution to the initial training regimen solution;
        determining if the neighbor solution is a better solution than the initial training regimen solution;
        replacing the initial training regimen solution with the neighbor solution if the neighbor solution is a better solution; and
        updating the distance per a schedule to compute a next neighbor solution,
    wherein the determining of the neighbor solution is a better solution occurs using Performance=$S \cdot St \cdot N^c \cdot T^{-d}$, and $$St = \left[ \frac{\sum lag}{P} \cdot \frac{P_i}{T_i} \cdot \frac{\sum_i^j (lag_{max_{i,j}} - lag_{min_{i,j}})}{N_i} \right],$$

wherein S is a scalar, c is a learning rate, d is a decay rate, T is true time passed since training began, N is a discreet number of training events over a training period, lag is an amount of true time passed between training events, and P is a true amount of time amassed in practice.

10. The apparatus of claim 9, wherein the program code is further configured to optimize the training regimen by computing neighbor solutions until a local minima or local maxima is found.

11. The apparatus of claim 10, wherein the program code is further configured to optimize the training regimen utilizing Monte Carlo methods to compute the neighbor solutions.

12. The apparatus of claim 9, wherein the training objective is selected from a group consisting of: performance objectives, cost objectives, schedule objectives, and combinations thereof.

13. The apparatus of claim 9, further comprising:
    a display; and
    the program code is further configured to graphically overlay predicted training performance with optimized training performance.

14. The apparatus of claim 9, further comprising:

a display; and the program code is further configured to graphically display historical training performance with at least one of predicted training performance and optimized training performance.

15. A program product, comprising:

a computer recordable type medium; and a program code configured to optimize a training regimen to achieve performance goals, the program code resident on the computer recordable type medium and further configured, when executed on a hardware implemented processor to provide historical training data, define at least one training regimen, select a training objective for the at least one training regimen to optimize, and optimize the training regimen by:

computing an initial training regimen solution;

computing a neighbor solution at a distance from the initial training regimen solution;

comparing the neighbor solution to the initial training regimen solution;

determining if the neighbor solution is a better solution than the initial training regimen solution;

replacing the initial training regimen solution with the neighbor solution if the neighbor solution is a better solution; and updating the distance per a schedule to compute a next neighbor solution, wherein the determining of the neighbor solution is a better solution occurs using Performance=S·St·$N^c \cdot T^{-d}$, and $$St = \left[ \left| \frac{\sum lag}{P} \cdot \frac{P_i}{T_i} \cdot \frac{\sum_i^j (lag_{max_{i,j}} - lag_{min_{i,j}})}{N_i} \right| \right],$$

wherein S is a scalar, c is a learning rate, d is a decay rate, T is true time passed since training began, N is a discreet number of training events over a training period, lag is an amount of true time passed between training events, and P is a true amount of time amassed in practice.

16. The program product of claim 15, wherein the program code is further configured to optimize the training regimen by computing neighbor solutions until a local minima or local maxima is found.

17. The program product of claim 16, wherein the program code is further configured to optimize the training regimen utilizing Monte Carlo methods to compute the neighbor solutions.

18. The program product of claim 15, wherein the training objective is selected from a group consisting of: performance objectives, cost objectives, schedule objectives, and combinations thereof.

19. The program product of claim 15, wherein the program code is further configured to graphically overlay predicted training performance with optimized training performance.

20. The program product of claim 15, the program code is further configured to graphically display historical training performance with at least one of predicted training performance and optimized training performance.

* * * * *